United States Patent [19]

Czapp et al.

[11] Patent Number: 5,445,410
[45] Date of Patent: Aug. 29, 1995

[54] INSTRUMENT PANEL ASSEMBLY HAVING HIDDEN AIR BAG DOOR DISPOSED LATERALLY BETWEEN VENTS

[75] Inventors: Adelbert T. Czapp, Huntington Woods; Mark A. Huber, Ann Arbor; Bradley C. Bos, Livonia; William F. Diss, Shelby Township; David E. Thomas, North Branch, all of Mich.

[73] Assignee: Chrysler Corporation, Highland Park, Mich.

[21] Appl. No.: 259,094

[22] Filed: Jun. 13, 1994

[51] Int. Cl.6 .............................................. B60R 21/20
[52] U.S. Cl. .................................. 280/728.3; 280/732
[58] Field of Search ................... 280/728 B, 732, 752, 280/728 R; 180/90

[56] References Cited

U.S. PATENT DOCUMENTS

| | | | |
|---|---|---|---|
| 4,895,389 | 1/1990 | Pack, Jr. | 280/732 |
| 4,989,897 | 2/1991 | Takada | 280/732 |
| 5,035,444 | 7/1991 | Carter | 280/732 |
| 5,066,037 | 11/1991 | Castrigno | 280/732 |
| 5,082,310 | 1/1992 | Bauer | 280/728 B |
| 5,145,207 | 9/1992 | Bederka | 280/732 |
| 5,148,322 | 10/1992 | Sun | 280/732 |

*Primary Examiner*—Karin L. Tyson
*Attorney, Agent, or Firm*—Edward A. Craig

[57] ABSTRACT

An instrument panel for an automotive vehicle has a door for concealing an air bag. The door is covered with an extension of the same decorative material that covers the instrument panel. The door is placed between two laterally spaced air vents.

10 Claims, 4 Drawing Sheets

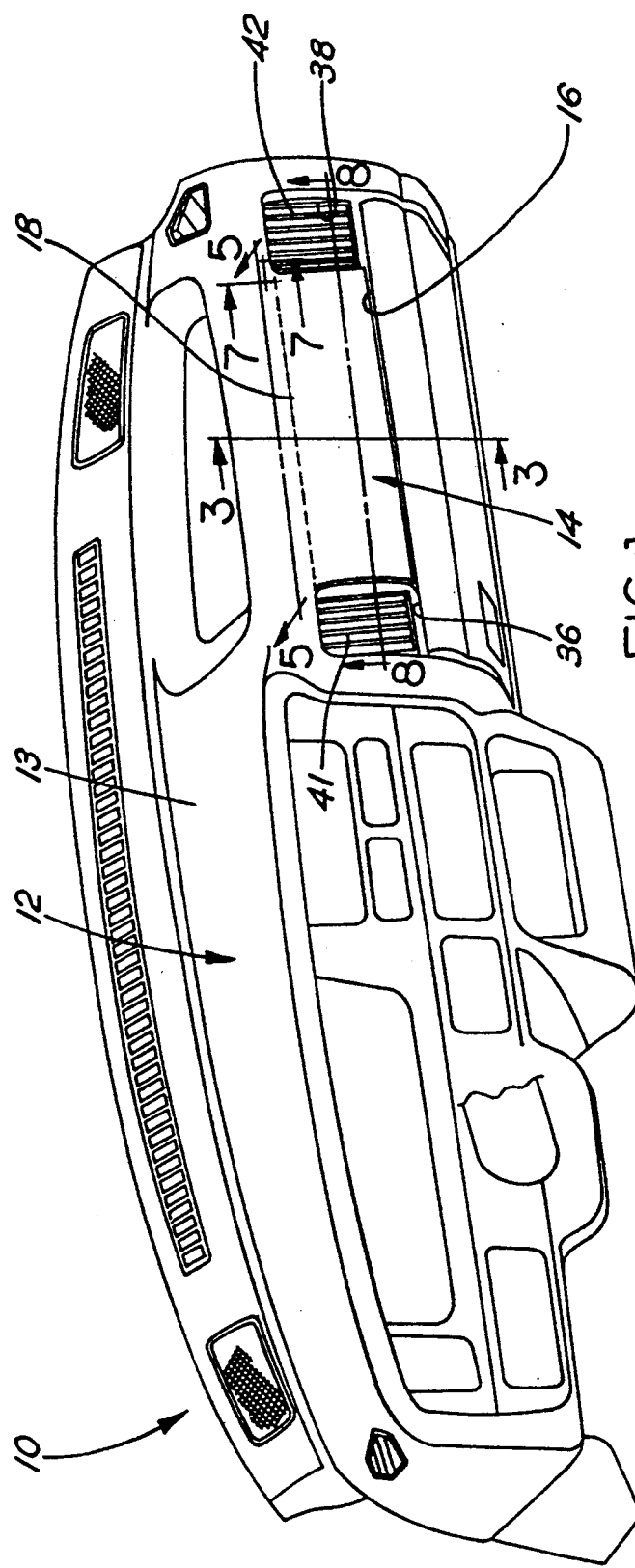
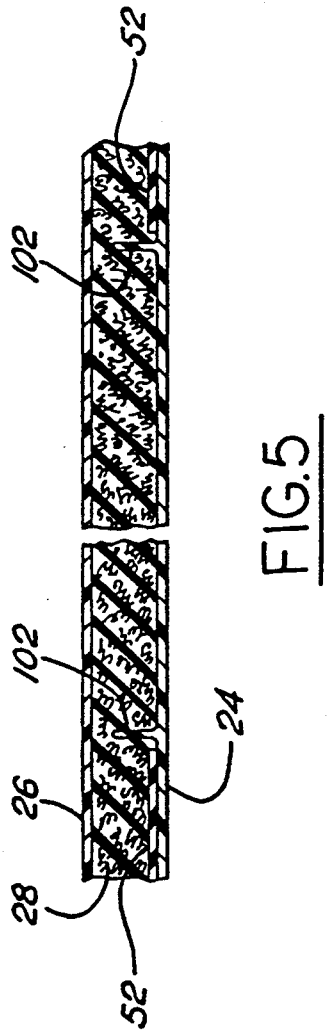
FIG. 1
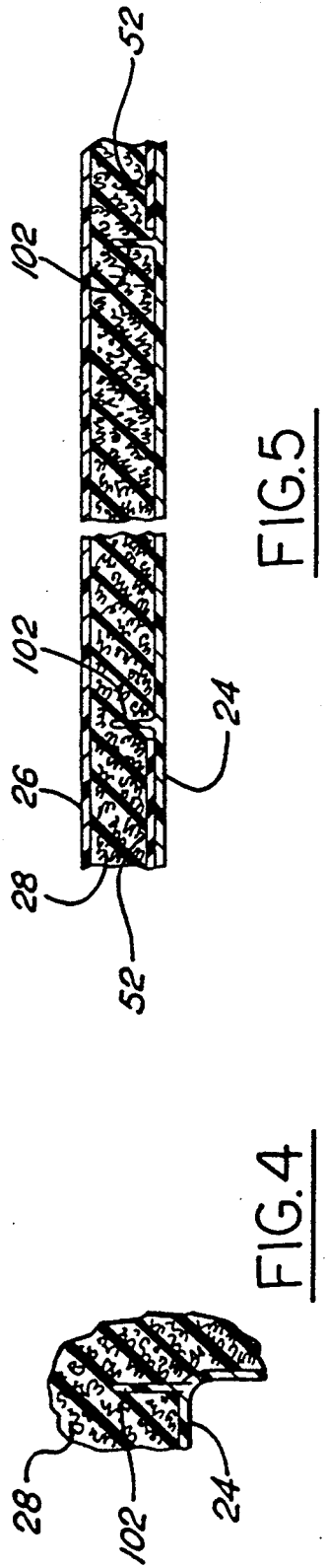
FIG. 4
FIG. 5

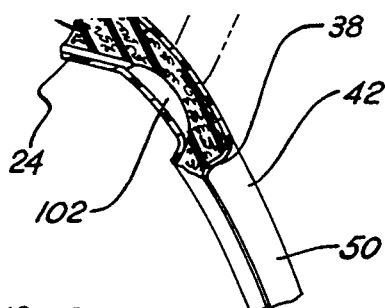
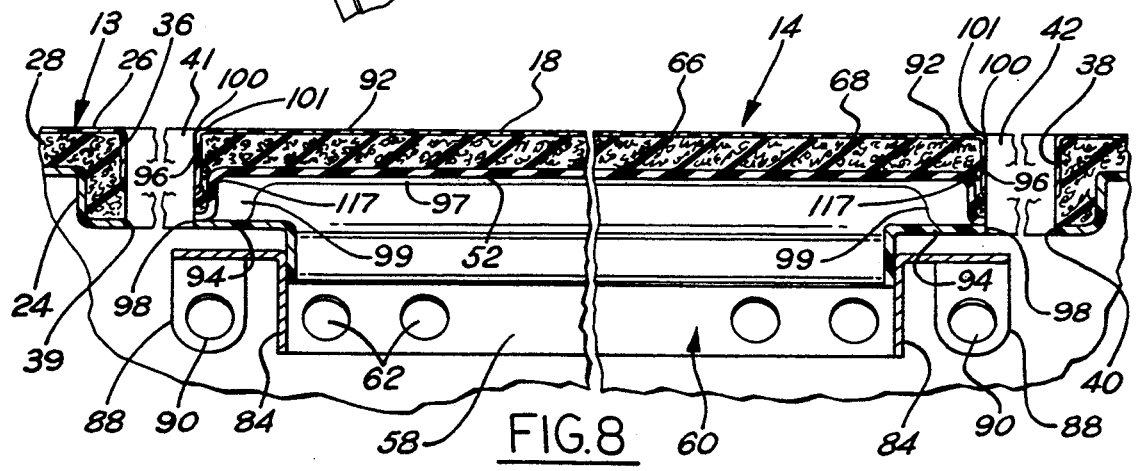
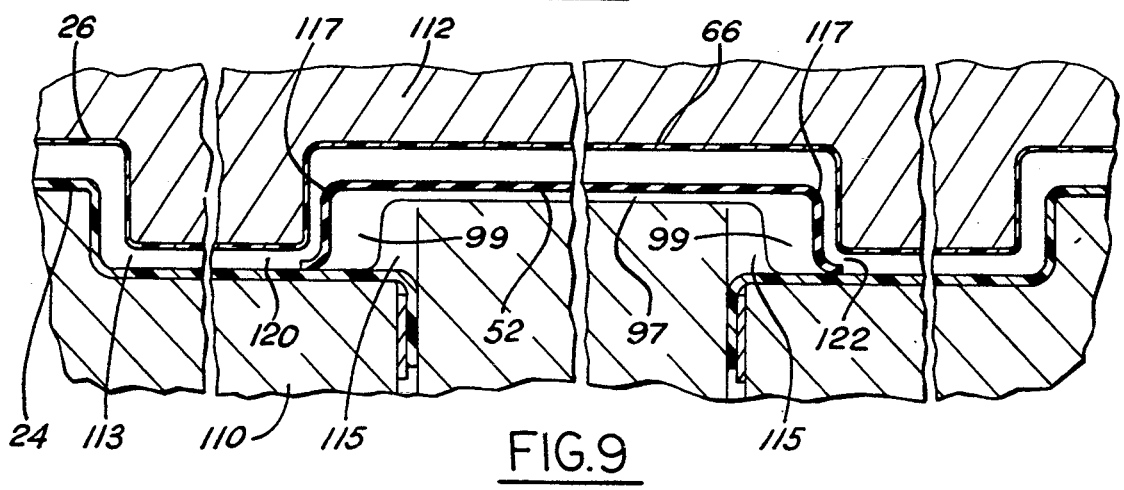

INSTRUMENT PANEL ASSEMBLY HAVING HIDDEN AIR BAG DOOR DISPOSED LATERALLY BETWEEN VENTS

FIELD OF THE INVENTION

This invention relates generally to instrument panel assemblies for automotive vehicles and refers more particularly to an instrument panel assembly in which the door that conceals the passenger air bag is located between two air outlets.

BACKGROUND AND SUMMARY

The door covering the passenger air bag in an automotive vehicle opens only when the air bag deploys. At all other times the door remains closed.

In the past, the door covering the air bag has been made separately from the instrument panel. The door and the instrument panel might both be covered with the same decorative material which could be vinyl or the like. It was expected that the door would then blend in and not stand out as something different from the rest of the instrument panel.

This was not always the case. Often the decorative material used to cover the door was taken from a different lot having a slightly different shade or texture or gloss or grain, or the grain ran in a different direction. This was particularly noticeable along the seam lines of adjacent edges.

In accordance with the present invention, the door is attached to the instrument panel before the decorative material is applied. The decorative material is then applied as a single, continuous layer covering both the door and the instrument panel. The decorative material covering the door is an integral extension of the decorative material covering the instrument panel proper, and extends across the integral hinge at the top of the door.

Further, in accordance with the invention, the door is disposed between a pair of air vent apertures. An air outlet distributor is placed in each aperture and the inner edges of the distributors are substantially flush with the side edges of the door. The distributors are made of a different material than the decorative layer covering the instrument panel and door. Fit and finish along the side edges of the door is therefore not as critical as if the side edges formed a seam with the similarly covered instrument panel proper.

It is an object of this invention to provide an instrument panel assembly having the features referred to above.

Another object is to provide an instrument panel assembly which is easy to manufacture and assemble and which is attractive in appearance.

These and other objects, features and advantages of the invention will become more apparent as the following description proceeds, especially when considered with the accompanying drawings.

BRIEF DESCRIPTION OF THE DRAWINGS

FIG. 1 is a perspective view of an instrument panel assembly constructed in accordance with the invention.

FIG. 4 is a fragmentary sectional view taken on the line 4—4 in FIG. 2, with padding added.

FIG. 5 is a fragmentary sectional view taken on the line 5—5 in FIG. 1.

FIG. 7 is a fragmentary sectional view taken on the line 7—7 in FIG. 1.

FIG. 8 is a sectional view taken on the line 8—8 in FIG. 1, with parts broken away.

FIG. 9 is a fragmentary sectional view showing the instrument panel being molded between two parts of a mold.

DETAILED DESCRIPTION

Figure 2:
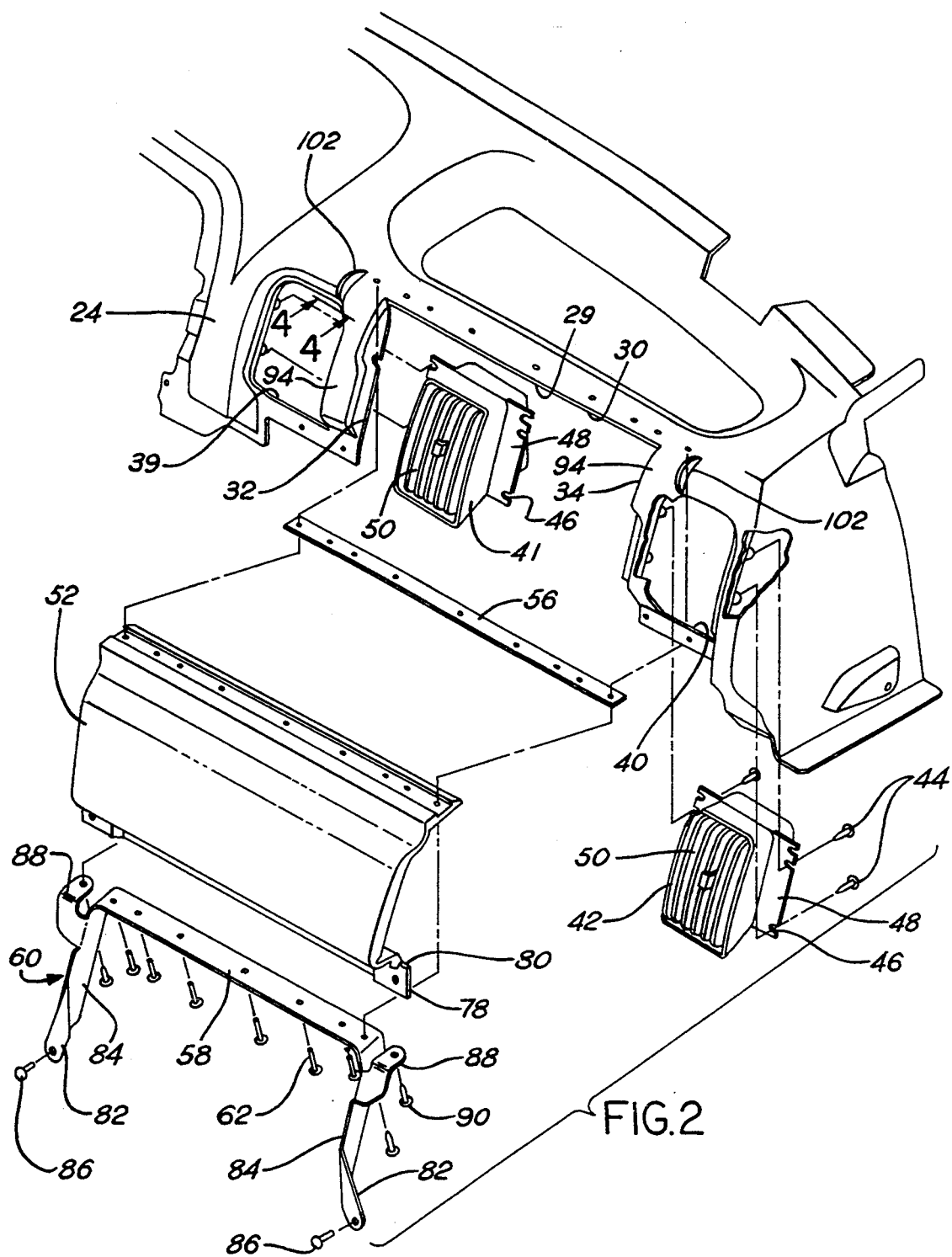
FIG. 2 is an exploded view in perspective showing the substrates of the instrument panel and door, without the padding and decorative cover layers, and also showing the frame which connects the substrates together as well as the air distributors.

Referring now more particularly to the drawings, the instrument panel assembly 10 of this invention comprises an elongated instrument panel 12 having a wall 13 provided with a closure 14 for covering an opening 16 in the instrument panel. The closure comprises a door 18 which conceals a stored air bag assembly A/B mounted in front of the opening 16. In a crash, the air bag forces the door open and deploys through the opening 16.

The instrument panel 12 comprises a substrate layer 24 of a relatively stiff, self-supporting, somewhat flexible thermoplastic material such, for example, as a mixture of ACRYLONITRILE-BUTADIENE-STYRENE (ABS) and polycarbonate, molded to the desired configuration. A decorative layer 26 of very flexible vinyl or the like covers the substrate 24, and a layer of foam padding 28 is sandwiched between the substrate layer 24 and the decorative layer 26. The foam padding may be an isocyanate, for example.

Referring to FIG. 2, the opening 16 is formed by an elongated generally rectangular cut-out 29 notched from the longitudinal edge along the lower portion of the substrate 24, having a top horizontal edge 30 and two vertical side edges 32 and 34° A generally rectangular aperture 36 is located beyond one side of the opening 16 and a generally rectangular aperture 38 is located beyond the opposite side of the opening. The cut-out portions in the substrate 24 defining these apertures are shown in FIG. 2 at 39 and 40. Portions of the decorative vinyl layer 26 and padding 28 over the cut-out portions 39 and 40 of substrate 24 are also cut out to complete the apertures 36 and 38. A/C air vent distributors 41 and 42 are mounted in the respective apertures 39 and 40. The distributors 41 and 42 may be identical and are mounted in the apertures by fasteners 44 engaged in slots 46 provided in distributor flanges 48 and threaded into substrate 24. The distributors have laterally spaced louvers 50 for directing the outflow of air through the apertures.

The door 18 comprises a generally rectangular substrate layer 52 of a flexible thermoplastic material, which preferably is a rubber-like elastomer such as a polyolefin, and more flexible than the substrate layer 24 of the instrument panel. The top edge portion 54 of the substrate layer 52 overlaps the substrate layer 24 of the instrument panel and is secured thereto by an elongated clamp bar 56 and an elongated frame bar 58. Clamp bar 56 extends over the outer side of the top edge portion 54. The frame bar 58 is part of a generally U-shaped metal frame 60 and extends behind or under the edge portion of substrate 24. The frame bar 58 is secured to the clamp bar 56 by rivets 62 extending through the overlapping material of the two substrates.

Figure 3:
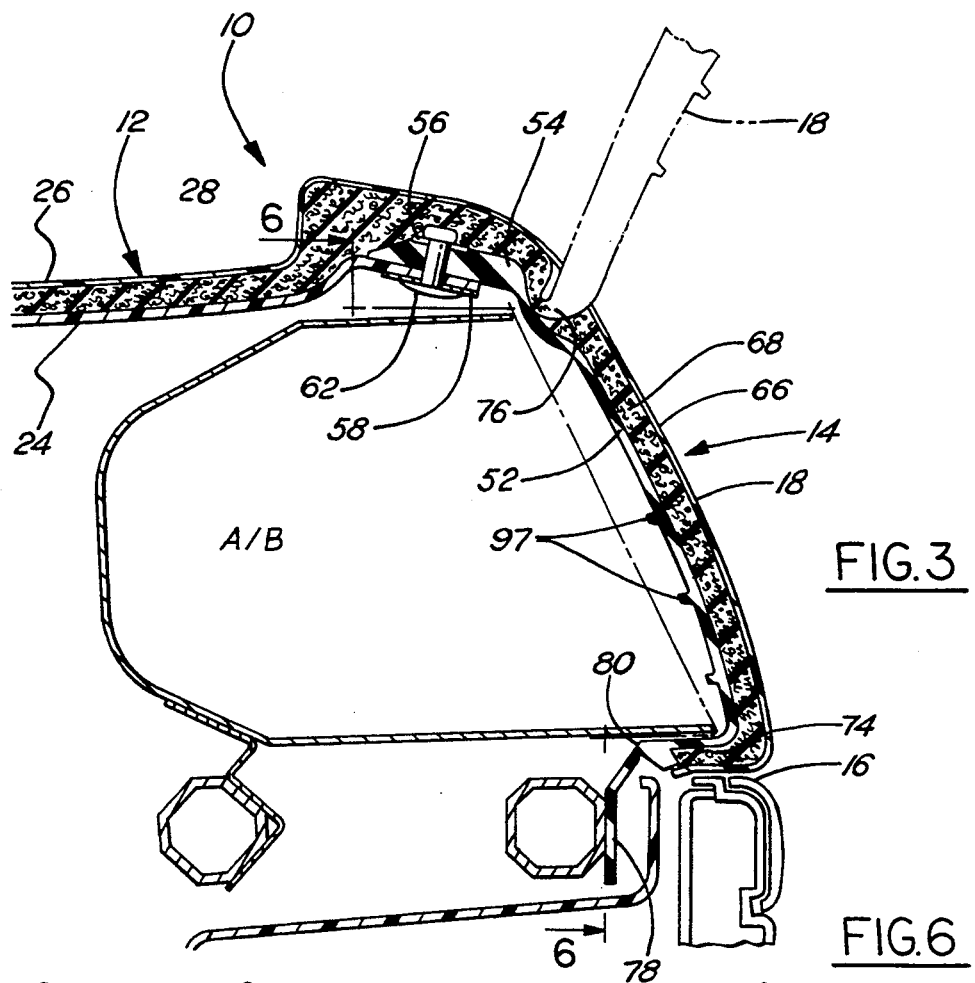
FIG. 3 is a sectional view taken on the line 3—3 in FIG. 1.
Figure 6:
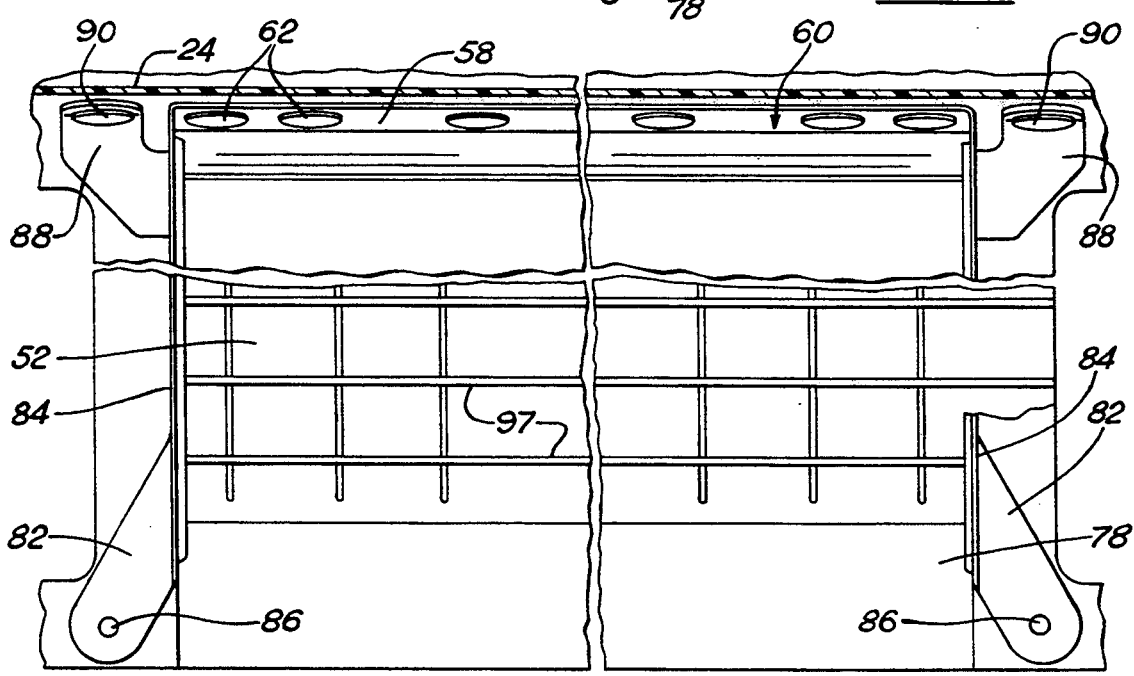
FIG. 6 is a view taken generally on the line 6—6 in FIG. 3, with parts broken away.

The decorative vinyl layer 26 for the instrument panel has an integral extension 66 which is substantially coextensive with and overlies the substrate 52 of the door. The padding 28 of the instrument panel also has an integral extension 68 which is sandwiched between the substrate 52 of the door and the vinyl extension 66. The door 18 consists of the substrate 52 and the vinyl and padding extensions 66 and 68, and is turned forwardly at the bottom as can be seen at 74 in FIG. 3. The door has an integral horizontal hinge 76 by means of which the door can swing open to the dot-dash position of FIG. 3. The hinge line 76 as shown is above the upper extremities of the apertures 36 and 38 although it may be positioned below the upper extremities of the apertures 36 and 38.

The lower edge portion of the substrate 52 of door 18 has an integral tear strip 78 which is joined to the substrate along a tear line 80 of reduced thickness. The strip 78 is not covered by the vinyl layer 26 or padding 28. The ends of the strip 78 are secured to the substrate 24 by integral tabs 82 extending laterally outwardly from the lower ends of legs 84 of frame 60 and by rivets 86. When the air bag inflates and forces open the door 18, the door substrate 52 tears away from the strip 78. Integral tabs 88 extend laterally outwardly from the upper ends of frame legs 84 and are secured to the substrate 24 by rivets 90. Legs 84 extend along opposite sides of the door.

The door 18 is wider than the opening 16 so that the side portions 92 of the door overlie the portions 94 of the instrument panel substrate 24 between the opening 16 and the apertures 36 and 38. These side portions 92 are spaced outwardly from portions 94 and terminate in inturned walls 96 which abut the portions 94. The walls 96 cooperate with the inner edges 98 of the cut-out portions 39 and 40 of substrate 24 in defining the laterally inner margins of the apertures 36 and 38, and at the bends 101 are substantially flush with the laterally inner margins 100 of the air outlet distributors 41 and 42 but may be inset or outset as desired. The inturned walls 96 define the side edges of the door throughout the vertical extent of the apertures 36 and 38.

The inner surface of door substrate 52 has vertically spaced, horizontally extending ribs 97 which have enlargements 99 at the ends that form spacers which contact the portions 94 of the substrate 24 for a purpose more fully described hereinafter.

The air outlet distributors 41 and 42 are preferably made of relatively hard and rigid metal or plastic, which is smooth and may be somewhat glossy, in contrast to the somewhat dull finish of the vinyl layer 66 covering the door 18. The distributors may also be of a different color than the vinyl for further contrast.

The distributors 41 and 42 are mounted in the apertures 36 and 38 in a manner such that the adjacent inner margins 100 of the distributors are substantially flush with the bend points 101 of the walls 96 of the door. Fit and finish along the side edges of the vinyl covered door where they meet the air distributors 41 and 42 in apertures 36 and 38 is not as critical as if the side edges formed seams with the similarly covered instrument panel proper.

The substrate 24 has integral, laterally spaced, elongated, upstanding ribs 102 which are perpendicular to the substrate and project into the foam toward the vinyl layer 26 along opposite sides of the door. The ribs 102 are substantially aligned with the laterally inner edges of apertures 36 and 38. When the door 18 opens, the side edge portions of door substrate 52 along apertures 36 and 38 easily break away from the substrate 24, but from the tops of the apertures to the hinge line 76 the cover layer 26 and padding 28 must tear to permit full opening of the door. The ribs 102 are on the tear lines and reduce the thickness of the padding 28 at such points, thereby facilitating the opening movement of the door.

The instrument panel assembly is made by initially molding the substrate 24 to its final form, including the cut-out 29 for the door, but not the cut-outs 39 and 40.

The substrate 52 of door 18 is also initially molded to its final form, after which it is secured to the substrate 24 by the frame 60 and rivets 62,86 and 90.

Also, the vinyl cover layer 26 is initially molded more or less to its final form. The cover layer 26 is in the nature of a highly flexible or floppy skin and may be vacuum formed over a heated die. The skin thus formed does not yet have cut-outs coinciding with the cut-outs 39 and 40 later to be formed in the substrate 24.

The initially molded substrate 24 and attached initially molded door substrate 52 are then placed in one part 110 of a two-part mold, and the initially molded vinyl cover layer 26 is placed in the other part 112 of the mold. Isocyanate foam is then introduced into the mold. The mold is closed, that is, the mold parts 110 and 112 are brought together as shown in FIG. 9 so that the main portion of the vinyl 26 confronts the substrate 24 of the instrument panel proper and the extension 66 of the vinyl confronts to door substrate 52 leaving a space 113 between the substrates 24 and 52 on one side and the vinyl cover layer 26 on the other. The foam will set and bond to the substrates 24 and 52 and to the vinyl 26 and vinyl extrusion 66, providing the padding 28 and 68.

It will be noted that there are open spaces 115 between the portions 94 of the substrate 24 and the side portions 92 of the door. It has been discovered that the foam introduced into the mold tends to cause the substrate 52 which is substantially more flexible than substrate 24, to bend or distort at the point of the bend 117. Should this occur, the bond of the foam padding to substrate 52 formed at the point of distortion tends to be weak. A weakened bond may fail when the air bag deploys and the door is forced open. To insure that this does not happen, the enlargements or spacers 99 at the ends of the ribs 97 on the substrate 52 of the door contact the portions 94 of substrate 24. These spacers 99 brace the door substrate 52 at the bend points 117 and thus prevent distortion when the foam is introduced under pressure, insuring a satisfactory bond between the foam padding 68 and the substrate 52.

After removal from the mold, the portions of the substrate 24, vinyl 26 and padding between the points 120 and 122 in FIG. 9 are punched out to complete the formation of apertures 36 and 38. By this punching operation, the main portion of the vinyl 26 is also separated from the extension 68 and the side edges of the door are defined.

We claim:

1. An instrument panel assembly for an automotive vehicle comprising:
   (a) an instrument panel having a wall provided with an opening,
   (b) said wall having a closure normally closing said opening and concealing a stored air bag before it is deployed through the opening in a crash, (c) said closure comprising a door having opposite side edge portions and a flexible, laterally extending hinge of one piece with the door, (d) said wall having a decorative cover layer provided with an extension covering said door, said extension being of one piece with the cover layer, (e) said door being capable of swinging open on said hinge in response to the force of impact of the air bag thereagainst when the air bag inflates so that the inflating air bag may deploy through the opening, (f) a pair of laterally spaced apart air vent apertures in said wall disposed respectively on opposite sides of said door, (g) said apertures having laterally inner edges defined by the side edge portions of said door so that there is no space between said laterally inner edges of the apertures and the side edge portions of the door, (h) an air outlet distributor in each said aperture, said air outlet distributors having laterally inner edges in juxtaposed, substantially abutting, flush relationship with the side edge portions of the door, and (i) the extension of said decorative layer covering said door and said air outlet distributors being made of materials that are different from one another and contrasting in appearance.

2. An instrument panel assembly as defined in claim 1, and further including an air outlet distributor in each said aperture, and said air outlet distributors having laterally inner edges substantially flush with the side edges of the door.

3. An instrument panel assembly as defined in claim 2 wherein the integral extension of said decorative layer covering said door and said air outlet distributors are made of materials that are different from one another and contrasting in appearance.

4. An instrument panel assembly as defined in claim 2 wherein said wall has a first substrate layer, said door has a second substrate layer overlapping said first substrate layer adjacent said hinge, means including a frame having a transverse frame bar adjacent said hinge rigidly interconnecting said first and second substrate layers at the overlap, said decorative cover layer overlying said first substrate layer and said integral extension of said decorative cover layer overlying said second substrate layer, and padding between said decorative cover layer and said first substrate layer and between said integral extension of said decorative cover layer and said second substrate layer.

5. An instrument panel assembly as defined in claim 1, wherein said wall has a first substrate layer, said door has a second substrate layer overlapping said first substrate layer adjacent said hinge, means interconnecting said first and second substrate layers at the overlap, said decorative cover layer overlying said first substrate layer and said extension of said decorative cover layer overlying said second substrate layer, padding between said decorative cover layer and said first substrate layer and between said extension of said decorative cover layer and said second substrate layer, said hinge extending along a line above said apertures, said first substrate layer having a pair of parallel ribs projecting into said padding toward said decorative cover layer, said ribs extending alongside the respective side edge portions of said door from the upper extremities of the apertures toward said hinge, said ribs projecting into said padding and reducing the thickness of said padding thereby establishing tear lines to facilitate opening of said door about said hinge when said air bag deploys.

6. An instrument panel assembly as defined in claim 5 wherein the integral extension of said decorative layer covering said door and said air outlet distributors are made of materials that are different from one another and contrasting in appearance.

7. An instrument panel assembly as defined in claim 6 wherein the integral extension of said decorative layer covering said door and said air outlet distributors are of different, contrasting colors.

8. An instrument panel assembly as defined in claim 6 wherein the integral extension of said decorative layer covering said door and said air outlet distributors are of materials that are different from one another and contrasting in color and texture.

9. An instrument panel assembly for an automotive vehicle comprising:

(a) an instrument panel having a wall provided with an opening, (b) said wall having a closure normally closing said opening and concealing a stored air bag before it is deployed through the opening in a crash, (c) said closure comprising a door having opposite side edge portions and a flexible, laterally extending hinge of one piece with the door, (d) said wall having a decorative cover layer provided with an extension covering said door, said extension being of one piece with the cover layer, (e) said door being capable of swinging open on said hinge in response to the force of impact of the air bag thereagainst when the air bag inflates so that the inflating air bag may deploy through the opening, (f) a pair of laterally spaced apart air vent apertures in said wall disposed respectively on opposite sides of said door, (g) said apertures having laterally inner edges defined by the side edge portions of said door, (h) an air outlet distributor in each said aperture, said air outlet distributors having laterally inner edges substantially flush with the side edges of the door, (i) said wall having a first substrate layer, (j) said door having a second substrate layer overlapping said first substrate layer adjacent said hinge, (k) means including a frame having a transverse frame bar adjacent said hinge rigidly interconnecting said first and second substrate layers at the overlap, (l) said decorative cover layer overlying said first substrate layer and said extension of said decorative cover layer overlying said second substrate layer, (m) padding between said decorative cover layer and said first substrate layer and between said extension of said decorative cover layer and said second substrate layer, (n) said hinge extending along a line above said apertures, (o) said first substrate layer having a pair of ribs projecting into said padding toward said decorative cover layer, said ribs extending alongside the respective side edge portions of said door from the upper extremities of the apertures toward said hinge, said ribs reducing the thickness of said padding and establishing tear lines to facilitate opening of said door about said hinge when said air bag deploys, (p) the extension of said decorative layer covering said door and said air outlet distributors being made of materials that are different from one another and contrasting in appearance, color and texture, (q) said frame being generally U-shaped and including side frame bars connected respectively to the ends of said transverse frame bar and extending along the side edge portions of said door and rigidly connected to said first substrate.

10. An instrument panel assembly as defined in claim 1 wherein said wall has a first substrate layer, said door has a second substrate layer overlapping said first substrate layer adjacent said hinge, means including a frame having a transverse frame bar adjacent said hinge rigidly interconnecting said first and second substrate layers at the overlap, said decorative cover layer overlying said first substrate layer and said extension of said decorative cover layer overlying said second substrate layer, and padding between said decorative cover layer and said first substrate layer and between said extension of said decorative layer and said second substrate layer, said frame being generally U-shaped and including side frame bars connected to the ends of said transverse frame bar and extending along the side edge portions of said door and rigidly connected to said first substrate.

* * * * *